TEST DEVICE FOR TELECOMMUNICATION SYSTEMS

Filed April 17, 1959

*Inventor*
S.Simon-E.De Raedt

By *Robert Harding Jr.*
*Attorney*

3,079,465

TEST DEVICE FOR TELECOMMUNICATION SYSTEMS

Stephane Marcel Clement Victor Simon and Egide Jacob Hendrik de Raedt, Antwerp, Belgium, assignors to International Standard Electric Corporation, New York, N.Y., a corporation of Delaware Filed Apr. 17, 1959, Ser. No. 807,160
Claims priority, application Belgium Apr. 28, 1958
8 Claims. (Cl. 179—18)

Figure 1:
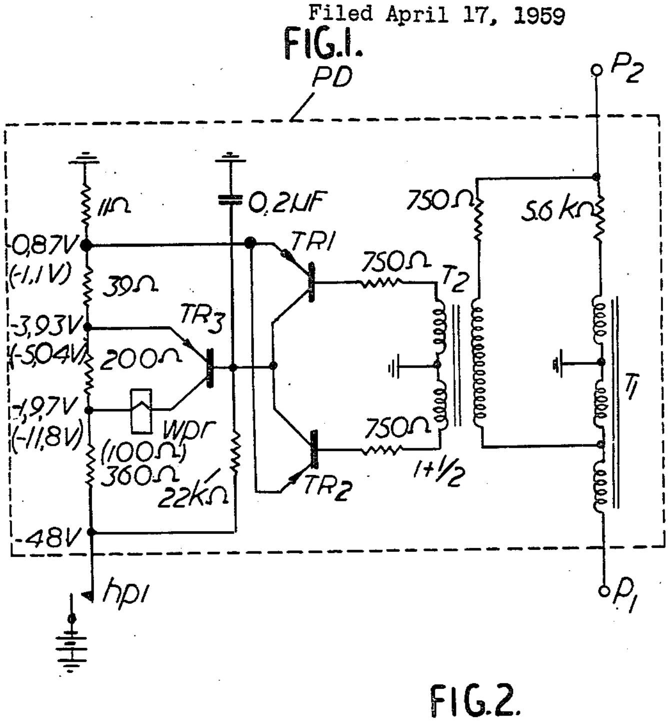

The invention relates to a test device for telecommunication systems and more particularly to a device applicable to the 7–E system. This telephone system is well known, and reference can for instance be made to the Dutch Patent No. 67,509 which describes the phase and D.C. tests that are accomplished from a register to cause the establishment of a selector on a described output. The phase discriminator used until now in the 7–E system necessitates gas tubes, and the arrangement is such that once the phase discriminator is operated, it becomes independent from the phase condition which has caused its operation. Therefore, the phase test has to be repeated a second time after the D.C. test, in order to ensure that the selector does not pass the desired output. Otherwise, it is necessary to start the selector again by means of a delay arrangement. Also, if the D.C. test is not successful, the selector has to be started again.

The general object of the present invention is to avoid the drawbacks mentioned above.

Another object of the invention is to realize an improved phase discriminator using transistors, and which remains constantly under the influence of the input signal having caused its operation.

According to a first characteristic of the invention, the detector comprises two transistors used to rectify the A.C. input signal which is present as long as there is no phase match, the rectified potential obtained at the terminals of a capacitor being used to block a third transistor and thus avoid the operation of a test relay which will only be operated when the A.C. voltage at the input of the phase discriminator is below a well determined threshold value.

According to another characteristic of the invention, the bases of the first two transistors are coupled to the A.C. input signal, the emitters are connected to the same point on a supply potentiometer, and the two collectors are connected to a terminal of a capacitor, to a terminal of a resistor, and to the base of the third transistor, the other ends of said capacitor and of said resistor being coupled to the supply source of said potentiometer, while the emitter of the third transistor is connected to a second point on said potentiometer and its collector is connected to a third point on said potentiometer by means of the winding of the test relay, the resistances of said potentiometer being calculated so as to produce a cumulative effect when operating the relay.

According to another characteristic of the invention, the D.C. test relay is rendered operative by the operation of the phase test relay, and the controlled selector is only stopped when the D.C. test relay is operated.

According to another characteristic of the invention, the phase test relay is not directly connected to a fixed D.C. potential, but to the D.C. test wiper, so that the thus formed loop circuit can only cause the operation of the test relay when the phase condition as well as the D.C. condition justify the operation of the test relay.

According to yet another characteristic of the invention, the phase test relay constantly remains under phase control, even after the operation of this relay, so that a selector can never be permanently stopped on another output than the one determined by the control phase applied in the register.

Figure 2:
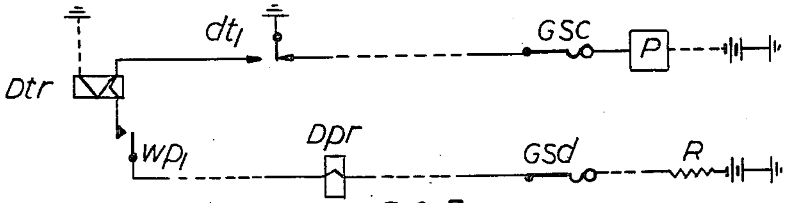
Figure 3:
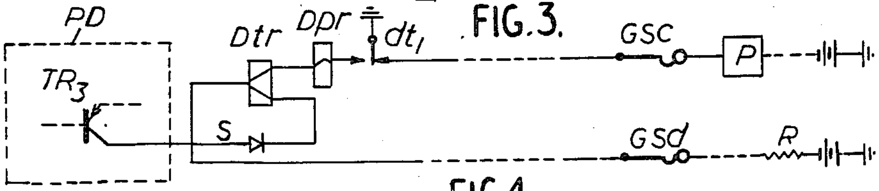

The above mentioned and other objects and features of the invention will become more apparent and the invention itself will be best understood by referring to the following description of an embodiment taken in conjunction with the accompanying drawings which represent:

FIG. 1, the circuit of a phase discriminator according to the invention;

FIG. 2, the principle of a test device for the selectors using the circuit of FIG. 1;

FIG. 3, a modification of the circuits of FIGS. 1 and 2; and

Figure 4:
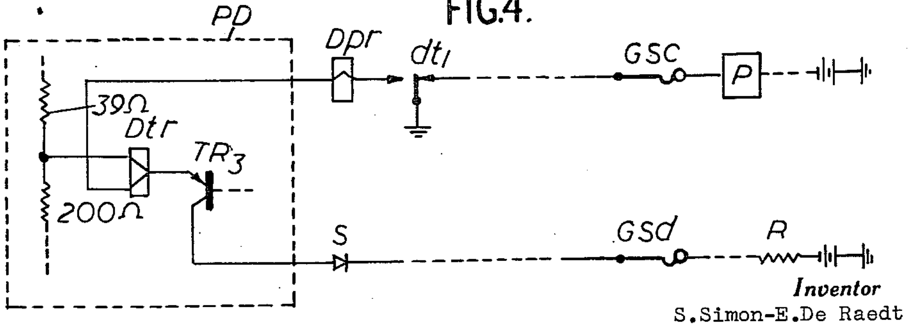

FIG. 4, another modification of the circuits of FIGS. 1 and 2.

Referring to FIG. 1, the phase discriminator PD is fed at terminal $P_1$ by an A.C. potential having a frequency of 450 c./s. and a phase which has a particular value given among 12 possible phases each separated by intervals of 30 degrees. Different phases, corresponding to these 12 phases, are successively applied to terminal $P_2$ until the two phases respectively applied to terminals $P_1$ and $P_2$ correspond, device PD being then adapted to react in order to cause the operation of relay *Wpr*.

Terminal $P_1$ is connected to one end of an autotransformer $T_1$, two other tappings of which, that are located symmetrically with respect to a grounded tapping, are connected to terminal $P_2$, the first across the primary winding of transformer $T_2$ and the 750 ohm resistor in series therewith, and the second across the 5.6 kilo ohm resistor. The parts of the winding between these two tappings have an equal number of turns, the junction being connected to ground. The 5.6 kilo ohm resistor is substantially equal to the impedance seen from the primary of transformer $T_2$ plus the value of the 750 ohm resistor. Terminals $P_1$ and $P_2$ are thus decoupled from each other. The 5.6 kilo ohm resistor thus has an equalizing function, while the object of the 750 ohm resistor is auxiliary, since it only prevents too low a D.C. resistance from being present between terminal $P_2$ and ground, which would be undesirable when the terminal is connected to the wiper of a selector of a telephone system, as the wiper could accidentally be connected to the battery potential.

The secondary winding of transformer $T_2$ is provided with a grounded median tapping and the total number of turns is equal to the number of turns of the primary winding. The ends of the winding of $T_2$ which are not connected to ground, are connected to the bases of transistors $TR_1$ and $TR_2$ respectively, through current limiting resistor each equal to 750 ohms. The emitters of transistors $TR_1$ and $TR_2$ are connected together and to the junction point of the 11 and 39 ohm resistors which are connected in series, together with two other resistors of 200 and 360 ohms, between ground and battery, so as to form a potentiometer. It is to be noted that the lower end of the 360 ohm resistor is only connected to the battery when the circuit is ready to be used, at which moment the operation of a relay *Hpr* (not shown) will close make contact $hp_1$. The collectors of transistors $TR_1$ and $TR_2$ are connected together and to one end of a capaictor of 0.2 $\mu f.$, the other end of which is connected to ground, and also to a 22 kilo ohm resistor, the other end of which is connected to contact $hp_1$. Moreover, the common connection of the collectors of transistors $TR_1$ and $TR_2$ is also directly connected to the base of transistor $TR_3$, the emitter of which is connected to the junction point of the 39 and 200 ohm resistors which are part of the potentiometer, while the collector of transistor $TR_3$ is connected to the junction point of the 200 and 360 ohm resistor of this potentiometer through the winding of relay *Wpr*.

With a —48 volt battery connected to the armature of contact $ph_1$, the potentials normally present at the various potentiometer terminals have been indicated at FIG. 1, the potentials in parentheses corresponding to the operated condition of relay *Wpr*.

Normally, in the absence of a correspondence between the phases (i.e. the phases of voltages applied at terminals $P_1$, $P_2$ exceed a predetermined phase angle) of the two A.C. voltages applied to terminals $P_1$ and $P_2$, a minimum A.C. potential difference exists at the terminals of the primary winding of transformer $T_2$ and consequently at the terminals of the secondary windings of this transformer. When this voltage is sufficient to overcome the negative bias of the emitters of transistors $TR_1$ and $TR_2$ with respect to their base, these transistors are alternately conductive and non-conductive so that the potential at the terminals of the 0.2 $\mu f$. capacitor is substantially equal to about —0.8 volt which is the potential normally applied to the emitters of $TR_1$ and $TR_2$. The emitter of $TR_3$ being then at a more negative potential, this transistor is thus non-conductive and relay *Wpr* is in the rest condition.

At the moment of a phase match (i.e. the phases of voltages applied at terminals $P_1$, $P_2$ are less than the predetermined phase angle), the voltages at the bases of $TR_1$ and $TR_2$ becoming insufficient, these two transistors are now cut-off and the potential at the terminals of the capacitor becomes rapidly more negative due to the resistive connection with the —48 volt battery. At the moment the base of $TR_3$ becomes more negative than the potential of its emitter, $TR_3$ will become conductive and cause the operation of relay *Wpr*. As soon as the collector current of $TR_3$ flows, the potentiometer current is increased due to the branching of the resistance of *Wpr* (100 ohm) in shunt with the 200 ohm resistor. Thus the emitter potential of $TR_1$ and $TR_2$ becomes more negative so that these transistors become still less conductive. In other words, a cumulative action is produced due to the positive feedback between the two transistor stages, $TR_1$ and $TR_2$ on the one hand and $TR_3$ on the other hand. Thus, a sharp operating threshold is obtained.

The potentiometer resistors will preferably be experimentally determined in order to obtain this sharp threshold. Care is to be taken not to exaggerate the positive feedback in order not to obtain a hysteresis phenomenon, i.e. an operation of relay *Wpr* for a given minimum A.C. voltage on transformer $T_1$, but a release of this relay for an A.C. voltage higher than this operation value.

FIG. 2 represents how the test device of FIG. 1 can be used in a 7–E type register. The high resistance winding of D.C. test relay D*tr* is connected to ground and its low resistance winding is connected to contact $wp_1$ of relay *Wpr* of FIG. 1. The junction point of these two windings is connected to make contact $dt_1$ of this relay. The armature of contact $wp_1$ is connected to D.C. test wiper GS*d* through the winding of relay D*pr*. In arc *d*, the battery potential is normally found through resistor R when the corresponding output is free. On the other hand, ground is connected to wiper GS*c* through changeover contact $dt_1$ in its rest position. By means of arc *c* one reaches the operating electro-magnet P of the selector controlled by the register the other end of which is connected to the battery.

Such as represented, the selector is consequently in rotation, and at the moment relay W*pr* operates when the correct phase is met, contact $wp_1$ is closed, but relay D*tr* can only operate if the battery is present in arc *d*. Only at this moment, contact $dt_1$ will be operated to stop the selector, and on the other hand close a circuit for the operation of the double test relay D*tr* through the low resistance winding of relay D*tr*.

FIG. 3 shows a modification of the arrangements of FIGS. 1 and 2, and the high resistance winding of relay D*tr* now takes the place of relay WP*r*, being connected to the collector of transistor $TR_3$ through a rectifier S intended to avoid the application of undesired voltages to the collector of $Tr_3$.

According to the circuit of FIG. 3, relays D*tr* and D*pr* will however, remain operated independently from phase discriminator PD. If this condition is found to be undesirable, and if it is desired that the operation of these relays be under permanent phase control, the arrangement of FIG. 4 can be used.

In FIG. 4, the high resistance winding of relay D*tr* is connected in the emitter circuit of transistor $TR_3$ and when the two relays D*tr* and D*pr* have been operated, they remain under the control of the phase detector.

While the principles of the invention have been described above in connection with specific apparatus, it is to be clearly understood that this description is made only by way of example and not as a limitation on the scope of the invention.

We claim:

1. A test device for telecommunication systems comprising a first input terminal to which alternating voltage of a predetermined frequency having one of a plurality of predetermined different phases may be applied, a second input terminal to which alternating voltage of said frequency may be applied in successive steps, each step having a different one of said plurality of phases, a first transistor, a phase discriminator connected between said first and second input terminals and said first transistor, means in said discriminator for causing said first transistor to conduct and thus rectify the alternating voltage when the phase match between the alternating voltages applied at said inputs is greater than a predetermined phase angle and for causing said first transistor to cease to conduct when the phase match between said alternating voltages is less than said predetermined phase angle a second transistor connected to said first transistor, circuit means connected to said first and second transistors and responsive to the conductivity of said first transistor for biasing said second transistor in its non-conducting condition and responsive to the cessation of conductivity of said first transistor for causing said second transistor to conduct, and load means responsive to the conductivity of said second transistor.

2. A test device, as defined in claim 1, in which the circuit means for biasing the second transistor in its nonconductive condition when the first transistor is conductive comprises a source of potentials a capacitor having one terminal connected to an electrode of each of said transistors and to one terminal of said source of potential and having its other terminal connected to the other terminal of said source of potential.

3. A test device, as defined in claim 1, in which there are a pair of first transistors with their input electrodes connected across the phase discriminator and their other electrodes connected in parallel.

4. A test device, as defined in claim 3, in which the base electrodes of the pair of first transistors are connected across the phase discriminator, the emitter electrodes are connected together, and the collector electrodes are connected together and to the base electrode of the second transistor, the circuit means for biasing said second transistor comprising a source of potential, a potentiometer connected across said source, a capacitor having one terminal connected to the collector electrodes of said pair of first transistors and to a point on said potentiometer, means for connecting the emitter electrodes of said pair of first electrodes to a point on said potentiometer, and means for connecting the emitter of said second transistor to another point on said potentiometer, and in which the load means comprises a phase test relay with its winding connected between the collector of said second transistor and still another point on said potentiometer.

5. A test device, as defined in claim 4, in combination with a selector switch, means for driving said switch, means for applying the alternating voltages having the predetermined different phases to contacts of said switch, means for connecting a wiper of said switch which cooperates with said contacts to the second input terminal of said device, and means for causing the opertion of the phase test relay to disable said driving means, whereby said switch is stopped when said switch wiper reaches a contact to which an alternating voltage has been applied whose phase matches that of the voltage applied to the first input terminal of said device.

6. A test device, as defined in claim 5, in which the means for disabling the switch driving means comprises a direct current test relay having contacts controlling said driving means, and means for operating said direct current test relay when the phase test relay is operated.

7. A test device, as defined in claim 3, in which the base electrodes of the pair of first transistors are connected across the phase discriminator, the emitter electrodes are connected together, and the collector electrodes are connected together, and to the base electrode of the second transistor, the circuit means for biasing said second transistor comprising a source of potential, a potentiometer connected across said source, a capacitor having one terminal connected to the collector electrodes of said pair of first transistors and to a point on said potentiometer, means for connecting the emitter electrodes of said pair of first electrodes to a point on said potentiometer, and means for connecting the emitter of said second transistor to another point on said potentiometer, said device being adapted for use in combination with a selector switch having a plurality of wipers and cooperating contact banks, means for driving said switch, means for applying the alternating voltages having predetermined different phases to the contacts of one of said banks, and means for connecting the wiper cooperating with said last-mentioned contacts to the second input terminal of said device, the load means comprising a phase test relay, means for connecting one end of the winding of said relay to the collector electrode of said second transistor, means for connecting the other end of said winding to another wiper of said switch, means for applying potentials to the contacts cooperating with said last-mentioned wiper under certain conditions, and means for causing the operation of said phase test relay to disable said driving means, whereby said switch is stopped when said first-mentioned switch wiper reaches a contact to which an alternating voltage has been applied whose phase matches that of the voltage applied to the first input terminal of said device and said second-mentioned wiper is simultaneously on a contact to which a potential has been applied.

8. A test device, as defined in claim 6, in combination with a selector switch, means for driving said switch, means for applying the alternating voltages having predetermined different phases to contacts of said switch, means for connecting a wiper of said switch which cooperates with said contacts to the second input terminal of said device, and means for causing the operation of the load means to disable said driving means, whereby said switch is stopped when said switch wiper reaches a contact to which an alternating voltage has been applied whose phase matches that of the voltage applied to the first input terminal of said device.

References Cited in the file of this patent

UNITED STATES PATENTS

| | | |
|---|---|---|
| 2,543,534 | Powell | Feb. 27, 1951 |
| 2,709,203 | Buchner | May 24, 1955 |
| 2,829,203 | Pitlik | Apr. 1, 1958 |
| 2,835,740 | Heetman | May 20, 1958 |